(12) United States Patent
Ohara

(10) Patent No.: US 7,611,771 B2
(45) Date of Patent: Nov. 3, 2009

(54) POLYPHOSPHATE FLAME RETARDANT

(75) Inventor: Kohei Ohara, Kyoto (JP)

(73) Assignee: Kawashima Selkon Textiles Co., Ltd., Kyoto (JP)

( * ) Notice: Subject to any disclaimer, the term of this patent is extended or adjusted under 35 U.S.C. 154(b) by 153 days.

(21) Appl. No.: 11/661,162

(22) PCT Filed: Aug. 22, 2005

(86) PCT No.: PCT/JP2005/015199

§ 371 (c)(1), (2), (4) Date: Feb. 22, 2007

(87) PCT Pub. No.: WO2006/022219

PCT Pub. Date: Mar. 2, 2006

(65) Prior Publication Data

US 2007/0259582 A1    Nov. 8, 2007

(30) Foreign Application Priority Data

Aug. 25, 2004 (JP) ............... 2004-244891
Aug. 25, 2004 (JP) ............... 2004-244892
Aug. 25, 2004 (JP) ............... 2004-244893

(51) Int. Cl.
B32B 5/16 (2006.01)

(52) U.S. Cl. ................ 428/405; 252/608; 524/116; 442/141

(58) Field of Classification Search ............... 442/136, 442/141, 142, 143, 144, 145; 428/403, 405, 428/407, 920; 523/608, 609; 524/116; 252/608, 252/609
See application file for complete search history.

(56) References Cited

U.S. PATENT DOCUMENTS

2007/0231574 A1* 10/2007 Conesa et al. ............... 428/375

FOREIGN PATENT DOCUMENTS

| JP | 2001-262466 | 9/2001 |
|---|---|---|
| JP | 2003-171878 | 6/2003 |

OTHER PUBLICATIONS

Marosi, et al., *Frame-Retarded Polyolefin System of Controlled Interphase*, Polym. Adv. Technol., 2002, vol. 13, No. 10-12, pp. 1103-1111, p. 1107, Figure 4.

*Study of the Flameproof-Treatment of Cotton Clothes*, Hideo Kakiki, et al., The Jissen Women's University Kaseigakubu Kiyo, vol. 22, 1985, pp. 59-63.

* cited by examiner

Primary Examiner—Arti Singh-Pandey
(74) Attorney, Agent, or Firm—Kirschstein, et al.

(57) ABSTRACT

The flame retardant according to the present invention is prepared by complexing a flame retardant polyphosphate compound with a silicone resin. The silicone resin is applied to cover the particles of the polyphosphate compound. As the polyphosphate compound, it is preferred to use ammonium polyphosphate having a weight average polymerisation degree of 20 to 2000. By applying the flame retardant of the present invention on fibers as a flame retardant resin composition containing a binder resin, environmentally soft flame retardant textile products can be stably obtained.

12 Claims, No Drawings

POLYPHOSPHATE FLAME RETARDANT

TECHNICAL FIELD

The present invention relates to a polyphosphate flame retardant comprising a complex of a polyphosphate compound and a silicone resin.

BACKGROUND TECHNOLOGY

Heretofore, halogen flame retardants containing halogen as the main component have been wildly used for making resin compositions and textile products flame retardant.

However, the resin compositions and the textile products made to be flame retardant by halogen flame retardants generate noxious halogen gas when burnt to cause secondary disaster due to gas poisoning on fire and also to cause environmental pollution problems when burnt up.

Therefore, a polyphosphate flame retardant containing no halogen has been noticed recently.

However, the polyphosphate flame retardant is easily dampened and its particles coagulate and enlarged. Thus, it is difficult to be uniformly dispersed in the resin composition and the flame retardant solution and the flame retardancy effect tends to be varied. Also, the resin compositions and the textile products treated by it are moistened and show bad feeling. The metal parts can be easily rusted and the textile products are deteriorated and discolored when touched to the flame retarded resin compounds and the textile product in use.

So, the following methods have been developed to suppress moisture adsorption of the polyphosphate flame retardant:

(1) a method for adding melamine to a polyphosphate flame retardant by making to coexist melamine or melamine urea with the raw materials for the preparation of the flame retardant (for example, refer to Patent Document 1)

(2) a method for giving waterproofing in which melamine phosphate is added to a treating solution containing a flame retardant in the flame retarding treatment by a melamine-added polyphosphate flame retardant (for example, refer to Patent Document 2)

(3) a method in which a malaine-formaldehyde resin is formulated to a raw material for the preparation of a polyphosphate flame retardant or a prepared dispersion to prepare microcapsules by wrapping the polyphosphate flame retardant (for example, refer to Patent Document 3)

(4) a method in which a silane-coupling agent is made to coexist in a melaime-added polyphosphate flame retardant to suppress bleeding of the polyphosphate flame retardant from the processed goods containing said flame retardant (for example, refer to Patent Documents 4, 5 and 6).

Patent Document 1: JP 1974-061099 A (JP 1986-15478 B)

Patent Document 2: JP 1876-023312 A (JP 1877-39930 B)

Patent Document 3: JP 1886-103962 A (JP 1992-55625 B)

Patent Document 4: JP 1990-263851 A (JP 1994-18944 B)

Patent Document 5: JP 1991-020342 A (JP 1994-04735 B)

Patent Document 6: JP 1991-056547 A (JP 1994-06655 B)

DISCLOSURE OF THE INVENTION

Problems to be Solved by the Invention

However, these methods cannot handle the problems as the melanine-added polyphosphate flame retardants generate residual formaldehyde gas and cause environmental pollution problems.

Here, the object of the present invention is to provide a polyphosphate flame retardant which is low in hygroscopicity and is not in danger of generating residual formaldehyde gas and is easy in handling and has a stable flame retarding effect. Thus, the object of the present invention is to provide a polyphosphate flame retardant which does not absorb moisture in storage nor coagulate and its fine powder condition is held stable by being wrapped by the resin film and is uniformly dispersed in a resin composition or a flame retarding solution in use and the resin film covering the surface does not cracked nor peeled off in stirring step and does not generate residual formaldehyde gas.

Means for Solving the Problems

The present inventor has completed the present invention on the basis of the knowledge that, apparent from the fact that the silicone resin is used in water-repellant, antisoiling agent and coking agent, the resin is hydrophobic and does not absorb moisture and the resin film is soft and difficult to be cracked, and especially the silicone resin comprising tetrafunctional or trifunctional monomer unit is tough and excellent in heat resistance and the polyphosphate flame retardant particles wrapped in the resin film does not become viscous nor coagulate in storage and uniformly dispersed in the resin composition and the flame retardant solution and the resin film is not cracked during stirring step and its dispersed condition is held stable.

The polyphosphate flame retardant according to the present invention is complex particles comprising a flame retardant polyphosphate compound and a silicone resin.

In the present invention, as the polyphosphate compound, any known flame retardants can be used. For example, useful are ammonium polyphosphate, polyphosphoramide, polyphosphoric acid carbamate, sodium tripolyphosphate, potassium polyphosphate, ammonium-potassium polyphosphate and guanidine polyphosphate. Particularly preferred is ammonium polyphosphate.

The weight average polymerisation degree of the polyphosphate compound is preferably 20 to 2000. A weight average polymerisation degree lower than 20 gives water solubility, while that higher than 2000 gives a longer polymerisation period to raise the cost and to lose utility. A particle size of 3 to 50 µm is preferred.

Now, the flame retardant of the present invention is a complex of such a poly-phosphate compound and a silicone resin and the silicone resin is used to cover the polyphosate compound particles.

As the silicone resin, especially preferred is a combination of a monofunctional monomer unit with a tetra- or trifunctional monomer unit.

The silicone resin is expressed by a general formula $(R_n\text{-}SiO_{(4-n)/2})_m$ where R is methyl, alkyl, fluoroalkyl, phenyl or vinyl, n=1 to 3, m≦2.

As the silicone resin, a hard resinous silicone resin comprising a combination of a monofunctional monomer unit expressed by a compositional formula $(CH_3)_3SiO_{1/2}$ with a tetrafunctional monomer unit expressed by a compositional formula $SiO_2$ and/or a trifunctional monomer unit expressed by a compositional formula $(CH_3)SiO_{3/2}$ is recommended in the respects of toughness and heat resistance.

An oily or gummy silicone resin such as a silicone resin comprising a monofunctional monomer unit expressed by a compositional formula $(CH_3)_3SiO_{1/2}$ alone, a silicone resin comprising a difunctional monomer unit expressed by a compositional formula $(CH_3)_2SiO$ or a combined silicone resin prepared by combining said monofunctional monomer unit with a difunctional monomer unit is not preferred.

The silicone resin is preferably prepared as a silicone resin solution by dissolving it in a solvent. However, it can be also used as a silicone resin dispersion. In the case of preparing a dispersion, it is preferred that the particle size of the silicone resin is made to be smaller than that of the polyphosphate compound, that is 3 to 25 μm, to ease the adhesion of the silicone resin on the surface of the polyphosphate compound particles.

The amount of the silicone resin used may be 2 to 20 parts by weight on the basis of 100 parts by weight of the polyphosphate compound.

To coat efficiently the polyphosphate compound particles by the silicone resin, it is preferred that, as shown in said Patent Documents 1 and 2, the silicone resin component is made to be coexist with the raw material for the preparation of the polyphosphate flame retardant, or, as shown in said Patent Document 3, the silicone resin solution or the silicone resin dispersion is mixed with powder or a dispersion of the polyphosphate flame retardant under stirring and heated. As the solvent for the silicone resin solution or the silicone resin dispersion, preferably used are hydrophilic organic solvents such as acetone, ethyl acetate and methyl alcohol.

Also, to coat the polyphosphate compound particles by the silicone resin, a mixed solution of silicone resin particles dispersion having an average particle size of 3 to 25 μm and a polyphosphate compound powder dispersion or a mixed solution prepared by mixing fine powder of a polyphosphate compound to a silicone resin solution prepared by dissolving fine powder of a silicone resin in an organic solvent such as toluene may be dried to give a mixture of silicone resin and a polyphosphate compound and the mixture is pulverized by a pulverizing equipment such as a ball mill and a jet-mill to give fine powder.

The silicone resin can be prepared as a mixed composition with UV absorbers, antioxidants or pigments. Also, to harden the silicone resin film covering the surface of the polyphosphate compound particles, it is preferred that a polymethyl acrylate resin is mixed with the silicone resin composition.

The silicone-added polyphosphate flame retardant comprising a flame retardant polyphosphate compound particles and a silicone resin thus prepared is used as a flame retardant resin composition formulated in a binder resin.

As the binder resin, there may be used resin emulsions such as an acrylic resin emulsion, a urethane resin emulsion and an ethylene-vinyl acetate resin emulsion.

In the case of that a silicone-added polyphosphate flame retardant is used for flame retarding treatment of textile products, it is recommended to use an acrylic resin emulsion as the binder resin.

As a matter of course, from the object of the present invention, a binder resin containing no halogen component nor formaldehyde shall be used.

The textile products flame retarded by the flame retardant composition according to the present invention may be products mainly comprising fibers, such as textile yarns, ropes, strings, fabrics, knitted goods, nonwoven fabrics, woven pile clothes, knitted pile clothes, tafted pile clothes, napped clothes, electrostatically flocked clothes, textile webs and nonwoven fabric-like fiber-laminated cushionings, and the slip structure and the use of the fibers are not particularly restricted.

For the textile products touching the body at one side such as chair cover, ceiling and wall covers and carpets (textile floorings and mattings), especially thick clothes such as woven pileclothes, knitted pileclothes, tafted pileclothes, napped clothes and electrostatically flocked clothes, it is preferred that a flame retardant is applied on the back side not touching to the body directly also to ensure the surface feeling.

EFFECT OF THE INVENTION

The silicone resin does not generate halogen gas and formaldehyde gas and has water repellency and is hydrophobic and does no absorb moisture. Its resin film is soft and is difficult to be cracked.

Therefore, the polyphosphate flame retardant particles prepared by coating the polyphosphate compound with a silicone resin film according to the present invention does not come to viscous in storage by absorbing moisture and does no coagulate and disperses uniformly in the resin composition and the flame retardant solution in use, and the resin film does not be cracked during stirring and its dispersed condition is held stable.

As the result, when applied on textile products, problems such as adhered spots, dispersion of flame retardancy, sliminess and sick house syndrome are not generated, and flame retardant textile products having soft feeling and stable quality can be obtained.

BEST MODE FOR EXECUTING THE INVENTION

The present invention will be illustrated by Examples as follows.

[Polyphosphate Flame Retardant]

Example 1

200 parts by weight of water was added to 100 parts by weight of a silicone resin emulsion (resin component: 20 weight % organopolysiloxane, KR-50 made by Meisei Kagaku Kogyo Co., Ltd.) and the mixture was heated to 80° C. and stirred for 20 minutes. To the obtained resin solution, ammonium polyphosphate particles having a weight average polymerisation degree of 1000 and having an average particle size of 8 μm were added at a ratio of 100 parts by weight of the ammonium polyphosphate particles to 6 parts by weight of the resin component to prepare an ammonium polyphosphate particles dispersion.

The ammonium polyphosphate particles dispersion was dried by heat to give a polyphosphate flame retardant coated by the resin.

Comparative Example 1

200 parts by weight of water was added to 100 parts by weight of an urethane resin emulsion (resin component: 30 weight % polyurethane, Hydrane HW-930 made by Dainippon Ink & Chemicals) and the mixture was heated to 80° C. and stirred for 20 minutes. To the obtained resin solution, ammonium polyphosphate particles having a weight average polymerisation degree of 1000 and having an average particle size of 8 μm were added at a ratio of 100 parts by weight of the ammonium polyphosphate particles to 6 parts by weight of the resin component to prepare an ammonium polyphosphate particles dispersion. The ammonium polyphosphate particles dispersion was dried by heat to give a polyphosphate flame retardant coated by the resin.

Comparative Example 2

200 parts by weight of water was added to 100 parts by weight of an ethylene-vinyl acetate resin emulsion (resin component: 45 weight % ethylene-vinyl acetate resin, YS-912 made by Nobuha Co., Ltd.) and the mixture was heated to 80° C. and stirred for 20 minutes. To the obtained resin solution, ammonium polyphosphate particles having a weight average polymerisation degree of 1000 and having an average particle size of 8 μm were added at a ratio of 100 parts by weight of the ammonium polyphosphate particles to 6 parts by weight of the resin component to prepare an ammonium polyphosphate particles dispersion. The ammonium polyphosphate particles dispersion was dried by heat to give a polyphosphate flame retardant coated by the resin.

Comparative Example 3

200 parts by weight of water was added to 100 parts by weight of an acrylic-resin emulsion (resin component: 50 weight % acrylic resin, NewCoat FH-45 made by Shin-Nakamura Kagaku Kogyo Co., Ltd.) and the mixture was heated to 80° C. and stirred for 20 minutes. To the obtained resin solution, ammonium polyphosphate particles having a weight average polymerisation degree of 1000 and having an average particle size of 8 μm were added at a ratio of 100 parts by weight of the ammonium polyphosphate particles to 6 parts by weight of the resin component to prepare an ammonium polyphosphate particles dispersion. The ammonium polyphosphate particles dispersion was dried by heat to give a polyphosphate flame retardant coated by the resin.

Comparative Example 4

200 parts by weight of water was added to 100 parts by weight of a melamine resin emulsion (resin component: 75 weight % melamine resin, Sumitex Resin M-3 made by Sumitomo Chemtex Co., Ltd.) containing a catalyst (Sumitex Accelerator ACX made by Sumitomo Chemtex Co., Ltd.) and the mixture was heated to 80° C. and stirred for 20 minutes. To the obtained resin solution, ammonium polyphosphate particles having a weight average polymerisation degree of 1000 and having an average particle size of 8 μm were added at a ratio of 100 parts by weight of the ammonium polyphosphate particles to 6 parts by weight of the resin component to prepare an ammonium polyphosphate particles dispersion. The ammonium polyphosphate particles dispersion was dried by heat to give a polyphosphate flame retardant coated by the resin.

Example 2

100 parts by weight of ammonium polyphosphate particles having a weight average polymerisation degree of 1000 and having an average particle size of 8 μm were added to a resin solution comprising 6 part by weight of a silicone resin (organopolysiloxane made by Shin-Etsu Chemical Co., Ltd.) and 100 parts by weight of toluene to prepare a dispersed solution of ammonium polyphosphate particles. The dispersed solution of ammonium polyphosphate particles was dried by heat to prepare a Polyphosphate flame retardant coated by the resin.

Example 3

100 parts by weight of ammonium polyphosphate particles having a weight average polymerisation degree of 1000 and having an average particle size of 20 μm were added to a resin solution comprising 6 part by weight of a silicone resin (organopolysiloxane made by Shin-Etsu Chemical Co., Ltd.) and 100 parts by weight of toluene to prepare a dispersed solution of ammonium polyphosphate particles. The dispersed solution of ammonium polyphosphate particles was dried by heat to prepare a polyphosphate flame retardant coated by the resin.

For 7 types of the polyphosphate flame retardants prepared by Examples 1 to 3 and Comparative Examples 1 to 4, the following tests were carried out.

(1) 100 parts by weight of water (60° C.) were respectively added to each of 100 parts by weight of the polyphosphate flame retardant coated by the resin and 100 parts by weight of a blanc untreated ammonium polyphosphate particles (Comparative Example 5) not coated by the resin and the mixtures were stirred for one minute to be moistured and then the slimy feelings of each particles were evaluated by the following criteria. The results are shown in Table 1.

⊚—When the particles are hold, the hand does not slip.

○—When the particles are hold, the hand slips indistinctly.

Δ—When the particles are hold, the hand slips slightly.

X—When the particles are hold, the hand slips.

(2) Each 5 gf of the polyphosphate flame retardant coated by the resin and a blanc untreated ammonium polyphosphate particles (Comparative Example 5) not coated by the resin were filled respectively in a scent bag (made by Oomi Odd Air Service Co., Ltd.) and tightly sealed and 2000 ml of air was fed in the scent bag and heated at 80° C. for 2 hours and the concentration of formaldehyde generated was measured by a Gas Tech detecting tube (formaldehyde detecting tube No. 91L made by Gas Tech Co., Ltd.). The results are shown in Table 1.

○—Formaldehyde was not detected.

X—Formaldehyde was detected (the detected concentration is shown by the numerical value of ppm unit).

TABLE 1

|  | Examples | | | Comparative Examples | | | | |
|---|---|---|---|---|---|---|---|---|
|  | 1 | 2 | 3 | 1 | 2 | 3 | 4 | 5 |
| Polyphosphate flame retardants Component (parts by weight) | | | | | | | | |
| Ammonium polyphosphate particles | 100 | 100 | 100 | 100 | 100 | 100 | 100 | 100 |
| (particle size: μm) | (8) | (8) | (20) | (8) | (8) | (8) | (8) | (8) |
| Water | 60 | — | — | 40 | 28 | 24 | 16 | — |
| Silicone resin emulsion | 30 | — | — | — | — | — | — | — |
| (resin component) | (6) | — | — | — | — | — | — | — |
| Silicone resin solution | — | 106 | 106 | — | — | — | — | — |
| (resin component) | — | (6) | (6) | — | — | — | — | — |

TABLE 1-continued

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Urethane resin emulsion | — | — | — | 20 | — | — | — | — |
| (resin component) | — | — | — | (6) | — | — | — | — |
| Ethylene-VA emulsion | — | — | — | — | 14 | — | — | — |
| (resin component) | — | — | — | — | (6) | — | — | — |
| Acrylic resin emulsion | — | — | — | — | — | 12 | — | — |
| (resin component) | — | — | — | — | — | (6) | — | — |
| Melamine resin emulsion | — | — | — | — | — | — | 8 | — |
| (resin component) | — | — | — | — | — | — | (6) | — |
| Properties |  |  |  |  |  |  |  |  |
| Adhered resin amount(wt. %) | 5.7 | 5.7 | 5.7 | 5.7 | 5.7 | 5.7 | 5.7 | None |
| Generation of formaldehyde | ○ | ○ | ○ | ○ | ○ | ○ | X1.8 | ○ |
| Sliminess of particles | ○ | ◉ | ◉ | Δ | X | X | ◉ | X |

[Flame Retardant Resin Composition]

Example 4

Each 25 parts by weight of the polyphosphate flame retardants covered by a resin prepared by Examples 1 to 3 and Comparative Examples 1 to 3 and a blanc untreated ammonium polyphosphate particles (Comparative Example 5) not coated by the resin were mixed with 100 parts by weight of an acrylic resin emulsion (resin component: 50 weight % acrylic resin, New Coat FH-45 made by Nakamura Kagaku Kogyo Co., Ltd.) and 2 parts by weight of a thickner (High Molecular Thickner 612 made by Sun Nopco Co., Ltd.) to prepare 8 types of flame retardant resin compositions (viscosity: 7000 mPa·s).

For these compositions, the dispersed conditions of ammonium polyphosphate particles immediately after the preparation and after stood for 24 hours and the periodical change in viscosity of the flame retardant resin compositions. The results are shown in Table 2.

Evaluation criteria are as follows.

(1) Dispersed Condition

○—The ammonium polyphosphate particles are dispersed with no separation.

Δ—The particles come to be dispersed condition temporarily but separate gradually.

X—The particles do not hardly come to dispersed condition and cannot be mixed.

▲—The particles separate and are precipitated.

(2) Change in Viscosity

○—There is no change in viscosity after 6 hours from the preparation.

Δ—Thickened after 6 hours from the preparation.

X—The particles are separated and precipitated and the viscosity cannot be measured.

TABLE 2

|  | Example | | | Comparative Example | | | | |
| --- | --- | --- | --- | --- | --- | --- | --- | --- |
|  | 1 | 2 | 3 | 1 | 2 | 3 | 4 | 5 |
| Flame retardant Composition |  |  |  |  |  |  |  |  |
| Composition (Parts by weight) |  |  |  |  |  |  |  |  |
| Flame retardant prepared by each Examples and Comp. Ex. | 25 | 25 | 25 | 25 | 25 | 25 | 25 | 25 |
| Acrylic resin emulsion (50% solid) | 100 | 100 | 100 | 100 | 100 | 100 | 100 | 100 |
| Thickener (50% solid) | 2 | 2 | 2 | 2 | 2 | 2 | 2 | 2 |
| Properties |  |  |  |  |  |  |  |  |
| Dispersed condision of particles immediately after preparation | ○ | ○ | ○ | ○ | ○ | ○ | ○ | Δ |
| Periodical change in dispersed condition | ○ | ○ | ○ | Δ | X | X | ○ | ▲ |
| Change in viscosity and slimy feel of particles | ○ | ○ | ○ | Δ | X | X | ○ | X |

[Flame Retarded Textile Products]

Example 5

8 types of the flame retardant resin composition prepared by Example 4 (viscosity: 7000 mPa·s) were respectively coated on the back surface of a pile warp knitted fabric of a pile metsuke of 450 gf/m² using polyester fibers to both of the pile yarns and the ground yarns and the knitted fabric was heated at 150° C. for 2 minutes for drying to prepare a flame retardant pile warp knitted fabric and it was tested as follows. The results are shown in Table 3.

(1) Flame Retardant Performance

The combustion velocity of the flame retardant pile warp knitted fabric held horizontal was measured according to Federal Motor Vehicle Safety Standard (FMVSS-302) and it was judged to be "flame retardant" when the flame does not reach the standard line.

(2) Presence of Generation of Formaldehyde

The flame retardant pile warp knitted fabric was cut to 10 cm square and filled in a scent bag (made by Oomi Odd Air Service Co., Ltd.) and sealed and 2000 ml of air was poured in the bag and the bag was heated at 80° C. for 1 hour and the concentration of formaldehyde generated was measured by a Gas Tech Detector (Gas Tech Detector No. 91L made by Gas Tech Co., Ltd.).

○—Formaldehyde was not detected.

X—Formaldehyde was detected (The detected concentration is shown by the numerical value in ppm unit.).

(3) Slimy Feel

A flame retardant pile warp knitted fabric was cut to 20 cm square to prepare two sheets of specimen. Each 5 ml of hot water at 60° C. were applied on the center of the surface (pile surface) of one specimen and on the center of back surface of the other specimen. They were touched by fingers immediately after and 5 minutes after the application and the following feels were evaluated.

◎—Sliminess was not felt.

○—Sliminess was felt indistinctly.

Δ—Sliminess was felt slightly.

X—Sliminess was felt clearly.

TABLE 3

|  | Example | | | Comparative Example | | | | |
| --- | --- | --- | --- | --- | --- | --- | --- | --- |
|  | 1 | 2 | 3 | 1 | 2 | 3 | 4 | 5 |
| Pile warp knitted fabric applied with a flame-retardant treatment | | | | | | | | |
| Applied amount of flame retardant composition (dry weight: gf/m²) | 118 | 115 | 120 | 106 | 122 | 115 | 122 | 114 |
| Adhered amount of flame retardant agent (dry weight: gf/m²) | 38.8 | 37.8 | 39.4 | 34.8 | 40.1 | 37.8 | 40.1 | 37.5 |
| Flame retardancy | FR. | FR. | FR. | FR. | FR. | FR. | FR. | FR. |
| Presence of generation of formaldehyde | ○ | ○ | ○ | ○ | ○ | ○ | X0.2 | ○ |
| Sliminess feel (Surface) | | | | | | | | |
| Immediately after hot water application | ◎ | ◎ | ◎ | ◎ | ◎ | ◎ | ◎ | ○ |
| 5 min. after hot water application | ◎ | ◎ | ◎ | Δ | Δ | Δ | ○ | X |
| (Back) | | | | | | | | |
| Immediately after hot water application | ◎ | ◎ | ◎ | Δ | X | X | ○ | X |
| 5 min. after hot water application | ○ | ○ | ○ | X | X | X | ○ | X |

The present inventor has investigated a procedure in which a polyphosphate compound was wrapped respectively in an urethane resin which is not in danger of generating residual formaldehyde gas (Comparative Example 1), and ethylene-vinyl acetate resin (Comparative Example 2), an acrylic resin Comparative Example 3) and a polymethyl methacrylate resin to suppress its hygroscopicity. The urethane resin, the ethylene-vinyl acetate resin and the acrylic resin got easily intimate with water and gave slimy feel and their particles coagulated in storage in the same manner as a polyphosphate flame retardant not treated for moisture proofing. They were difficult to be dispersed uniformly in the resin composition and the flame retarding solution in use and the resin films were cracked during dispersion process and peeled off to expose the polyphosphate compound and the moisture proofing effect by the resin film was lost and resultantly the flame retardant effect was liable to variation.

Though the polymethyl methacrylate resin was relatively rigid and gave no slimy feel, the resin film was easily cracked in the dispersion step in the resin composition and the flame retarding solution and the moisture proofing effect by the resin film was deteriorated disadvantageously.

In Comparative Example 4 using a melamine resin, formaldehyde gas was generated to make it to be no utility.

What is claimed is:

1. A polyphosphate flame retardant comprising complex particles of a polyphosphate compound having flame retardancy and a silicone resin, in which said polyphosphate compound includes particles having an average particle size of 3 to 50 μm, and said silicone resin is expressed by a general formula $(RnSiO_{(4-n)/2})_m$ where R is methyl, alky, fluoroalkyl, phenyl or vinyl, n=1 to 3, and m≧2, and said silicone resin is adhered around the particles of said polyphosphate compound.

2. The polyphosphate flame retardant according to claim 1, in which the weight average polymerization degree of said polyphosphate compound is 20 to 2000.

3. The polyphosphate flame retardant according to claim 1, in which said polyphosphate compound is ammonium polyphosphate.

4. The polyphosphate flame retardant according to claim 1, in which said silicone resin comprises a combination of a monofunctional monomer unit and a tetrafunctional monomer unit and/or a trifunctional monomer unit.

5. A flame retardant composition prepared by compounding a polyphosphate flame retardant comprising complex particles of a flame retardant polyphosphate compound and a silicone resin to a binder resin, in which said polyphosphate compound includes particles having an average particle size of 3 to 50 μm, and said silicone resin is expressed by a general formula $(RnSiO_{(4-n)/2})_m$ where R is methyl, alkyl, fluoroalkyl, phenyl or vinyl, n=1 to 3 and m≧2, and said silicone resin is fixed around the particles of the polyphosphate compound.

6. The flame retardant resin composition according to claim 5, in which the weight average polymerization degree of said polyphosphate compound is 20 to 2000.

7. The flame retardant resin composition according to claim 5, in which said polyphosphate compound is ammonium polyphosphate.

8. The flame retardant resin composition according to claim 5, in which said binder resin is an acrylic resin.

9. A flame retardant textile product prepared by a procedure in which a flame retardant resin composition prepared by compounding a polyphosphate flame retardant comprising complex particles of a flame retardant polyphosphate compound and a silicone resin in a binder resin is fixed on fibers, in which said polyphosphate compound includes particles having an average particle size of 3 to 50 μm, and said silicone resin is expressed by a general formula $(RnSiO_{(4-n)/2})_m$ where R is methyl, alkyl, fluoroalkyl, phenyl or vinyl, n=1 to 3 and m≧2, and said silicone resin is fixed around the particles of the polyphosphate compound.

10. The flame retardant textile product according to claim 9, in which the weight average polymerization degree of said polyphosphate compound is 20 to 2000.

11. The flame retardant textile product according to claim 9, in which said polyphosphate compound is ammonium polyphosphate.

12. The flame retardant textile product according to claim 9, in which said binder resin is an acrylic resin.

\* \* \* \* \*